United States Patent
Pfaffenzeller et al.

(10) Patent No.: US 8,757,333 B2
(45) Date of Patent: Jun. 24, 2014

(54) VIBRATION DAMPING METHOD

(75) Inventors: Peter Pfaffenzeller, Munich (DE); Heinrich Stein, Emmering (DE); Mirco Hauke, Munich (DE); Hubert Strobl, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1130 days.

(21) Appl. No.: 11/399,638

(22) Filed: Apr. 7, 2006

(65) Prior Publication Data

US 2006/0243548 A1    Nov. 2, 2006

Related U.S. Application Data

(63) Continuation of application No. PCT/EP2004/052337, filed on Sep. 28, 2004.

(30) Foreign Application Priority Data

Oct. 10, 2003    (DE) .................................. 103 47 219

(51) Int. Cl.
*F16F 9/512*    (2006.01)

(52) U.S. Cl.
USPC .... 188/266.1; 188/275; 188/280; 188/322.15

(58) Field of Classification Search
USPC .......................... 188/266.1, 280, 275, 322.15
See application file for complete search history.

(56) References Cited

U.S. PATENT DOCUMENTS

| | | | |
|---|---|---|---|
| 3,389,766 A | 6/1968 | Henry-Blabaud | |
| 3,704,767 A | 12/1972 | Takagi | |
| 3,706,362 A | 12/1972 | Faure | |
| 4,474,271 A | 10/1984 | Moelders et al. | |
| 4,809,828 A * | 3/1989 | Nakazato | 188/282.6 |
| 4,961,482 A | 10/1990 | Pohlenz et al. | |
| 5,107,969 A | 4/1992 | Klein et al. | |
| 5,509,512 A | 4/1996 | Grundei | |
| 5,529,154 A * | 6/1996 | Tanaka | 188/282.6 |
| 6,102,170 A | 8/2000 | de Molina et al. | |
| 6,220,406 B1 | 4/2001 | de Molina et al. | |
| 2001/0009214 A1* | 7/2001 | Tanaka | 188/275 |

(Continued)

FOREIGN PATENT DOCUMENTS

DE    1 967 943    9/1967
DE    1 580 771    7/1970

(Continued)

OTHER PUBLICATIONS

International Search Report dated Dec. 17, 2004 Including English Translation of relevant portion and PCT/ISA/237 (Twelve (12) pages).

(Continued)

*Primary Examiner* — Robert A Siconolfi
*Assistant Examiner* — Mahbubur Rashid
(74) *Attorney, Agent, or Firm* — Crowell & Moring LLP

(57) ABSTRACT

A vibration damping method on a vehicle wheel suspension is provided in which, in a hydraulic vibration damper, the damping force increases highly progressively as a function of the piston speed, especially in the range of a piston speed of essentially 0 to 2 m/s, increasing at first slowly and essentially linearly and then especially beyond a piston speed of essentially 2 m/s increasing highly progressively.

8 Claims, 1 Drawing Sheet

(56) References Cited

U.S. PATENT DOCUMENTS

| | | | |
|---|---|---|---|
| 2002/0104722 A1* | 8/2002 | Lutz et al. | 188/281 |
| 2002/0189913 A1* | 12/2002 | Lemieux | 188/275 |
| 2003/0010587 A1* | 1/2003 | Eroshenko | 188/314 |
| 2003/0160369 A1 | 8/2003 | LaPlante et al. | |

FOREIGN PATENT DOCUMENTS

| | | |
|---|---|---|
| DE | 27 12 010 | 9/1977 |
| DE | 37 29 187 A1 | 3/1989 |
| DE | 37 29 187 C2 | 3/1989 |
| DE | 38 13 402 A1 | 11/1989 |
| DE | 94 02 417 U1 | 4/1994 |
| DE | 44 03 196 A1 | 8/1994 |
| DE | 199 21 125 A1 | 11/1999 |
| FR | 2 041 630 | 1/1971 |
| GB | 1 578 185 | 3/1977 |
| JP | 2000186734 A * | 7/2000 |

OTHER PUBLICATIONS

German Search Report dated Apr. 7, 2004 including English Translation of relevant portion (Four (4) pages).

Opposition dated Jun. 28, 2007.

German Office Action dated Dec. 6, 2011 including partial English-language translation (Six (6) pages).

* cited by examiner

VIBRATION DAMPING METHOD

This application is a continuation application of International application PCT/EP2004/052337 filed Sep. 28, 2004 and claims the priority of German application No. 103 47 219.3, filed Oct. 10, 2003, the disclosure of which are expressly incorporated by reference herein.

BACKGROUND AND SUMMARY OF THE INVENTION

The invention relates to a method for damping vibration on a vehicle wheel suspension with a hydraulic vibration damper.

German patent document DE 37 29 187 C2 describes a vibration damper with which the damping forces are adjustable for both directions of movement, indefinitely and independently, even during a spring deflection and recoil movement. Such a vibration damper has at least two working chambers separated by a piston with main overflow valves. A piston rod attached to the piston is guided through one of the working chambers. In addition to the main overflow valves, the working chambers are connected by an overflow opening that has an adjustable opening cross section. A control element held in a resting position in which the overflow opening is at its maximum size is triggered such that the size of the overflow opening is reduced as needed and thus the damping effect induced by the vibration damper is increased. The control element may be operated electrically, magnetically, hydraulically or by inertial forces, for example. DE 199 21 125 A1 discloses an inertial force-controlled device for adjusting the opening cross section of an overflow channel between the working chambers.

The disclosure content of German patent documents DE 37 29 187 C2 and DE 199 21 125 A1 is herewith included explicitly in the present description to ensure a complete disclosure of all the functions of the vibration damper.

In adjusting the damping force of a motor vehicle, the damping force characteristic up to approximately 1-2 m/s piston speed is considered with regard to comfort and driving safety. As a rule, a slightly progressive rise is obtained automatically from the selected piston/valve combination for damper characteristics greater than 2 m/s. However, this is not usually taken into account separately in chassis design.

At very high vertical wheel speeds much greater than 2 m/s, such as those occurring when driving over a pothole or a threshold, for example, great loads occur in the vehicle body and chassis in the end stop range due to accelerated unsprung masses. In the usual vibration dampers, the damping force for such high piston speeds is too low to adequately dissipate the kinetic energy of the accelerated wheel, which means that most of the energy must be carried by the body structure. This means that the structural components involved are massive and heavy and are therefore expensive to manufacture. If the damping force of the vibration damper is increased on the whole, this has a negative effect on driving comfort at a vertical speed of less than 2 m/s.

Therefore, the object of the present invention is to provide a vibration damping method on a motor vehicle wheel suspension by means of a hydraulic vibration damper which prevents great loads on the vehicle body and chassis caused by very large vertical velocities of the wheel, e.g., when traveling over potholes or thresholds, and to do so without making any sacrifice in driving comfort or driving safety.

In a hydraulic vibration damper for a motor vehicle, a method of vibration damping on a wheel suspension used according to the present invention is characterized in that the damping force of the vibration damper increases as a function of piston speed, especially in the piston speed range of essentially 0 to 2 m/s, at first increasing slowly, essentially linearly, and then, especially above a piston speed of essentially 2 m/s, increasing according to a highly progressive function.

This has the advantage that the vibration damper prevents great loads on the body and chassis caused by very high vertical wheel speeds, e.g., when driving over an obstacle or a threshold, and does so without any sacrifice in terms of driving comfort or driving safety. Due to the highly progressive rise in damping force, especially beyond a piston speed of essentially 2 m/s, the vibration damper dissipates the energy of high vertical wheel speeds more rapidly and therefore prevents great loads on the body and chassis. The piston speed, beyond which a highly progressive rise in the damping force is to advantageously take place, is defined by the end of the comfort-relevant range in chassis design. According to the present consensus, the comfort-relevant range for passenger vehicles ends at a piston speed of approximately 2 m/s. However, this value may easily be 1 m/s to 4 m/s for certain desired vehicle properties due to differences in chassis design.

Through a suitable choice, design and construction of vibration damper valves or by otherwise influencing the hydraulic resistances in the vibration damper, it is possible to implement a characteristic which is generated by damping forces known from the state of the art in the piston speed range up to the end of the range that is relevant for comfort. Beyond this piston speed range, an extreme progression in the damper characteristic is induced to decelerate the accelerated masses to a greater extent. This ultimately produces reduced loads in the vehicle body and chassis owing to a lower residual energy in the end stop area and also permits lighter and less expensive designs of the vehicle body, chassis and the vehicle itself. This is especially advantageous for vehicles having a low range of the spring, e.g., for sporty vehicles with a low design. A longer vehicle lifetime under poor road conditions is achieved with less damage to the body structure.

In a preferred embodiment of the vibration damping method, the characteristic of the damping force runs essentially as a function of the piston speed, following the highly progressive rise, continuing with a steeper, essentially linear rise.

It is even more advantageous if, following the steep, essentially linear course or following the highly progressive rise in the characteristic curve of the damping force as a function of piston speed, this characteristic curve then develops into an essentially linear course with a slight increase.

In other preferred embodiments of the vibration damping method, the vibration damper has an adjustment device for the damping force it produces. By operation of this adjustment device, the characteristic of the damping force may be displaced essentially along the abscissa as a function of the piston speed.

The starting point of the progression, which is defined by the design, is therefore advantageously adjustable.

Other objects, advantages and novel features of the present invention will become apparent from the following detailed description of the invention when considered in conjunction with the accompanying drawings for example.

DETAILED DESCRIPTION

Figure 1:
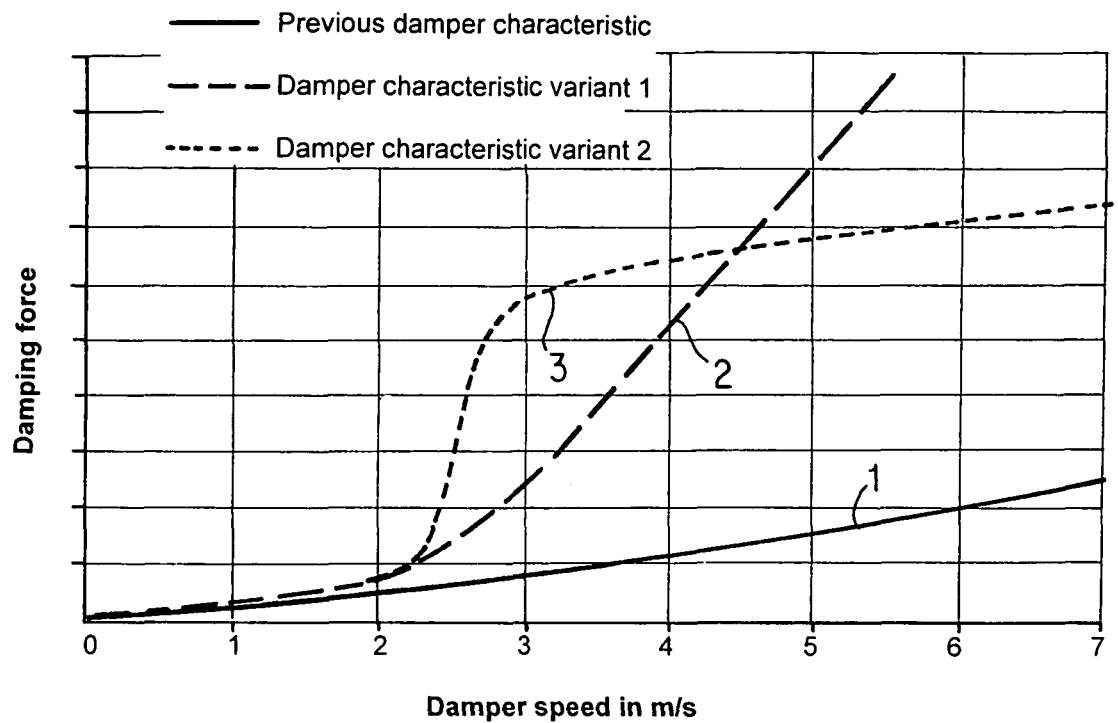
FIG. 1 shows characteristics of different damping force curves as a function of the piston speed of the inventive vibration damping method and according to the state of the art.

The first characteristic variant 1 of a damping force curve, represented by a continuous line in FIG. 1 as a function of piston speed is generated by a vibration damping method for a wheel suspension of a motor vehicle according to the state of the art. In damping force adjustment for motor vehicles, in particular for passenger vehicles, the damper characteristic is considered up to a piston speed of approximately 1-2 m/s from the standpoint of comfort and driving safety. As a rule, for a damping force characterization greater than 2 m/s, at most only a slightly progressive rise is obtained from the piston/valve combinations according to the state of the art. This is usually assumed in chassis design.

At very high vertical accelerations of the wheel greater than 2 m/s, such as those occurring, for example, in driving over an obstacle or a threshold, extremely high loads occur in the vehicle body and chassis due to the accelerated unsprung masses in the end stop range.

This results in an extremely massive and reinforced and therefore heavy and expensive design of the structural components involved. The damping force for such high accelerations is too low in the usual dampers according to the state of the art, which means that most of the energy must be supported by the vehicle body structure.

Therefore, the present invention proposes a vibration-damping method in which through a suitable choice and design and construction of valves or through some other influence on the hydraulic resistances, a characteristic 2, 3 is achieved, generating essentially the damping forces known as customary in the past in the piston speed range up to approximately 2 m/s which has usually been considered in the past. Only above speeds of greater than approximately 2 m/s is an extreme progression generated in the damper characteristic 2, 3 in comparison with the characteristic 1 to decelerate the accelerated masses to a greater extent.

The two characteristic curves 2 (shown as a dashed line) and 3 (shown as a dotted line) are examples of alternatives of inventive vibration damping methods on a motor vehicle wheel suspension using a hydraulic vibration damper. They are characterized in that the damping force of the vibration damper increases at first slowly, essentially linearly, as a function of the piston speed, especially in the range of a piston speed of essentially 0 to 2 m/s, and then, especially above a piston speed of essentially 2 m/s, increases essentially with a highly progressive characteristic. The characteristic curve 2 increases further essentially linearly according to a progressive curve at approximately 2 to 3 m/s. After a highly progressive rise at approximately 2 to 2.5 m/s, the characteristic curve 3 develops into a gently rising, essentially linear curve again in the range of 2.5 to 3 m/s.

This reduces the acceleration of the masses and loads in the body and chassis. Lighter and less expensive designs of the body, chassis and vehicle are possible. This is advantageous in particular for vehicles having a short spring range, e.g., in sporty vehicles or in vehicles with very low clearance above road surface. The result is a longer lifetime of the vehicle and less damage to the body structure on extremely bad roads.

Figure 2:
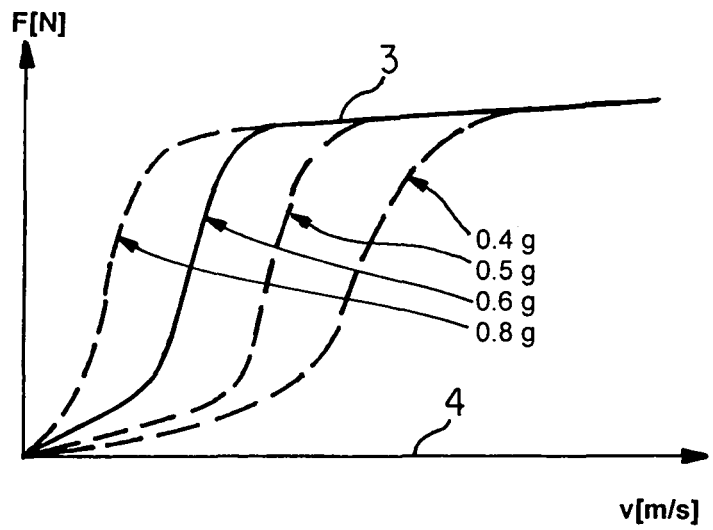
FIG. 2 shows characteristics of different damping force curves as a function of the piston speed of an inventive vibration damping method, shown here for a vibration damper controlled as a function of inertial force, depending on the inertial force acting on it.

Such inventive characteristic curves can also be implemented, for example, with vibration dampers that are controlled based on the inertial force via a regulating valve. It is then possible to operate with the characteristic variants of different damper force curves as a function of piston speed as depicted in FIG. 2 when using the same vibration damper, depending on the effect of the inertial force on the regulating valve. The four different characteristic curves for different inertial forces are illustrated as depicted on the basis of fractions of the force of acceleration due to gravity. All implement according to this invention a vibration damping method in which the damping force of the vibration damper increases as a function of the piston speed, at first increasing slowly, essentially linearly, and then above a certain piston speed increasing essentially in a highly progressive manner. The characteristic curves then continue with a steeper rise, essentially linear, and then develop into a curve having an essentially linearly slightly increasing slope. With all four characteristics, the start of the highly progressive rise occurs at a piston speed which is still in the range that is relevant for comfort. Due to the adjusting device of the vibration damper, which is controlled here by the force of inertia, the characteristic of the damping force as a function of the piston speed is displaced essentially along the abscissa 4 as depicted here.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vibration damping method for a vehicle wheel suspension, comprising the acts of:
    adjusting a damping force of a hydraulic vibration damper as a function of damper piston speed, wherein in a piston speed range of essentially 0 to 2 m/s, the damping force increases essentially linearly as piston speed increases, and beyond a piston speed range of essentially 2 m/s the damping force increases in a highly progressive manner relative to the damping force increase in the essentially 0 to 2 m/s piston speed range.

2. The vibration damping method as claimed in claim 1, wherein the highly progressive increase in damping force is provided in a first portion of the beyond essentially 2 m/s piston speed range, and in a second portion the damping force continues to increase as a function of the piston speed in essentially a linear manner.

3. The vibration damping method as claimed in claim 2, wherein damping force increase in the second portion of the piston speed range beyond essentially 2 m/s is at a rate essentially equal to the rate of damping force increase in the essentially 0 to 2 m/s piston speed range.

4. The vibration damping method as claimed in claim 2, wherein damping force increase in the second portion of the piston speed range beyond essentially 2 m/s is at a rate substantially greater than the rate of damping force increase in the essentially 0 to 2 m/s piston speed range.

5. The vibration damping method as claimed in claim 1, wherein the vibration damper has a damping force adjusting device and a damping force characteristic defining damping force as a function of piston speed, further comprising the act of:
    operating the damping force adjusting device to shift the damping force characteristic relative to piston speed.

6. The vibration damping method as claimed in claim 2, wherein the vibration damper has a damping force adjusting device and a damping force characteristic defining damping force as a function of piston speed, further comprising the act of:

operating the damping force adjusting device to shift the damping force characteristic relative to piston speed.

7. The vibration damping method as claimed in claim 3, wherein the vibration damper has a damping force adjusting device and a damping force characteristic defining damping force as a function of piston speed, further comprising the act of:

operating the damping force adjusting device to shift the damping force characteristic relative to piston speed.

8. The vibration damping method as claimed in claim 4, wherein the vibration damper has a damping force adjusting device and a damping force characteristic defining damping force as a function of piston speed, further comprising the act of:

operating the damping force adjusting device to shift the damping force characteristic relative to piston speed.

* * * * *